(12) United States Patent
McBeath et al.

(10) Patent No.: US 8,942,190 B2
(45) Date of Patent: Jan. 27, 2015

(54) HARQ PROCESS NUMBER MANAGEMENT FOR DOWNLINK CARRIER AGGREGATION

(75) Inventors: Sean McBeath, Irving, TX (US); Zhijun Cai, Irving, TX (US); Yi Yu, Irving, TX (US)

(73) Assignee: Blackberry Limited, Waterloo (CA)

( * ) Notice: Subject to any disclaimer, the term of this patent is extended or adjusted under 35 U.S.C. 154(b) by 747 days.

(21) Appl. No.: 12/723,202

(22) Filed: Mar. 12, 2010

(65) Prior Publication Data

US 2010/0254328 A1 Oct. 7, 2010

Related U.S. Application Data

(60) Provisional application No. 61/160,555, filed on Mar. 16, 2009.

(51) Int. Cl.
*H04W 4/00* (2009.01)
*H04L 1/18* (2006.01)
(Continued)

(52) U.S. Cl.
CPC ............ *H04L 1/1822* (2013.01); *H04L 1/1812* (2013.01); *H04L 5/007* (2013.01); *H04L 5/003* (2013.01); *H04L 27/26* (2013.01)
USPC ........................................................ 370/329

(58) Field of Classification Search
USPC ......... 370/203, 204–215, 229–253, 310–337, 370/395.3, 395.4, 395.41, 395.42, 395.5, 370/395.52, 431–457, 458–463, 464–497, 370/498–522, 523–529
See application file for complete search history.

(56) References Cited

U.S. PATENT DOCUMENTS 7,580,713 B2   8/2009   McBeath et al.
7,733,827 B2 * 6/2010   Kim et al. ..................... 370/328

(Continued)

FOREIGN PATENT DOCUMENTS

EP   1950903 A1   7/2008
JP   2012500845 A  1/2012
(Continued)

OTHER PUBLICATIONS

PCT International Search Report and Written Opinion, PCT/US2010/027164, Nov. 5, 2010.
(Continued)

*Primary Examiner* — Jung-Jen Liu
(74) *Attorney, Agent, or Firm* — Novak Druce Connolly Bove + Quigg LLP

(57) ABSTRACT

A method for use with a mobile user agent, the method for managing Hybrid Automatic Repeat reQuest (HARQ) processes in a multi carrier communication system that uses HARQ process indicators (HPIs) to manage HARQ processes, the method comprising the steps of designating a first subset of the HPIs as shared HPIs wherein each shared HPI designates a HARQ process irrespective of which of a plurality of system carrier frequencies are used to transmit a traffic packet, designating a second subset of the HPIs as non-carrier-shared HPIs wherein each non-carrier-shared HPI, in conjunction with the carrier frequency used to transmit a traffic packet, designates a carrier frequency unique HARQ process, receiving an HPI at the mobile user agent, receiving a first traffic packet via a carrier frequency at the user agent that is associated with the HPI, where the HPI is a first subset HPI using the HPI to identify a HARQ process associated with the first traffic packet irrespective of the carrier frequency used to transmit the traffic packet and providing the traffic packet to the identified HARQ process and where the HPI is a second subset HPI using the HPI and the carrier frequency on which the first traffic packet was received to identify a carrier frequency specific HARQ process associated with the first traffic packet and providing the first traffic packet to the carrier frequency specific HARQ process.

8 Claims, 11 Drawing Sheets

(51) Int. Cl.
*H04L 5/00* (2006.01)
*H04L 27/26* (2006.01)

(56) References Cited

U.S. PATENT DOCUMENTS

| | | | | |
|---|---|---|---|---|
| 7,774,686 | B2* | 8/2010 | Ahn et al. | 714/776 |
| 7,940,795 | B2* | 5/2011 | Frederiksen et al. | 370/468 |
| 7,957,329 | B2* | 6/2011 | Ahn et al. | 370/280 |
| 8,023,990 | B2* | 9/2011 | Parkvall | 455/522 |
| 8,054,767 | B2* | 11/2011 | Choi et al. | 370/280 |
| 2006/0291403 | A1 | 12/2006 | Kahtava et al. | |
| 2009/0180435 | A1* | 7/2009 | Sarkar | 370/330 |
| 2009/0268693 | A1* | 10/2009 | Lindh et al. | 370/336 |
| 2009/0276675 | A1* | 11/2009 | Ojala et al. | 714/749 |
| 2009/0300456 | A1* | 12/2009 | Pelletier et al. | 714/749 |
| 2009/0316758 | A1* | 12/2009 | Ahn et al. | 375/135 |
| 2010/0034303 | A1* | 2/2010 | Damnjanovic et al. | 375/260 |
| 2010/0080187 | A1* | 4/2010 | Papasakellariou et al. | 370/329 |
| 2010/0130219 | A1* | 5/2010 | Cave et al. | 455/450 |
| 2010/0157916 | A1* | 6/2010 | Kim et al. | 370/329 |
| 2010/0172308 | A1* | 7/2010 | Nam et al. | 370/329 |
| 2010/0208629 | A1* | 8/2010 | Ahn et al. | 370/280 |
| 2010/0227569 | A1* | 9/2010 | Bala et al. | 455/73 |
| 2010/0232488 | A1* | 9/2010 | Song et al. | 375/224 |
| 2010/0254328 | A1* | 10/2010 | McBeath et al. | 370/329 |
| 2010/0303011 | A1* | 12/2010 | Pan et al. | 370/328 |
| 2011/0182245 | A1* | 7/2011 | Malkamaki et al. | 370/329 |
| 2011/0194501 | A1* | 8/2011 | Chung et al. | 370/328 |
| 2011/0211489 | A1* | 9/2011 | Chung et al. | 370/252 |
| 2011/0211522 | A1* | 9/2011 | Chung et al. | 370/315 |
| 2011/0223927 | A1* | 9/2011 | Seo et al. | 455/450 |
| 2011/0274066 | A1* | 11/2011 | Tee et al. | 370/329 |

FOREIGN PATENT DOCUMENTS

| | | |
|---|---|---|
| WO | WO2006086878 A1 | 8/2006 |
| WO | WO2006116102 A2 | 11/2006 |
| WO | WO2007021122 A1 | 2/2007 |
| WO | WO2007061866 A2 | 5/2007 |
| WO | WO2008132599 A2 | 11/2008 |
| WO | WO2009132203 A1 | 10/2009 |
| WO | 2010098289 A1 | 9/2010 |

OTHER PUBLICATIONS

Ericsson, et al., Text Proposal for DC-HSDPA Assumptions and Standards Impact, 3GPP TSG-RAN WG1 Meeting #53, R1-082249, Kansas City, MO, USA, May 5-9, 2008.

3rd Generation Partnership Project; Technical Specification Group Radio Access Network; Multiplexing and Channel Coding (FDD) (Release 8), 3GPP TS 25.212 V8.5.0 (Mar. 2009).

LG Electronics, HARQ mapping across aggregated component carriers, 3GPP TSG RAN WG1 #56, R1-080652, Athens, Greece, Feb. 9-13, 2009.

3rd Generation Partnership Project; Technical Specification Group Radio Access Network; Evolved Universal Terrestrial Radio Access (E-UTRA) Medium Access Control (MAC) Protocol Specification (Release 8), 3GPP TS 36.321 V8.5.0 (Mar. 2009).

English translation of the Office Action mailed Nov. 6, 2013; in corresponding Japanese patent application No. 2012-500845.

"Downlink Control Channel Multiplexing in Evolved UTRA," Tanaka et al., dated Sep. 16, 2008.

Examination Report mailed Nov. 27, 2013; in corresponding European patent application No. 10709640.6.

Office Action mailed Nov. 6, 2013; in corresponding Japanese patent application No. 2012-500845.

English abstract for JP2012500845; published on Jan. 12, 2012 and retrieved Aug. 8, 2014.

English abstract for WO2010098289; published on Sep. 2, 2010 and retrieved Aug. 8, 2014.

The Second Office Action mailed Jul. 9, 2014; in corresponding Chinese patent application No. 201080021503.7.

English translation of the the Second Office Action mailed Jul. 9, 2014; in corresponding Chinese patent application No. 201080021503.7.

* cited by examiner

HARQ PROCESS NUMBER MANAGEMENT FOR DOWNLINK CARRIER AGGREGATION

CROSS-REFERENCE TO RELATED APPLICATIONS

This application is based on U.S. Provisional Patent Application Ser. No. 61/160,555 filed on Mar. 16, 2009 and entitled "HARQ PROCESS NUMBER MANAGEMENT FOR DOWNLINK CARRIER AGGREGATION."

BACKGROUND

The present invention relates generally to data transmission in mobile communication systems and more specifically to methods for managing HARQ process numbers for downlink carrier aggregation.

As used herein, the terms "user agent" and "UA" can refer to wireless devices such as mobile telephones, personal digital assistants, handheld or laptop computers, and similar devices that have telecommunications capabilities. In some embodiments, a UA may refer to a mobile, wireless device. The term "UA" may also refer to devices that have similar capabilities but that are not transportable, such as desktop computers, set-top boxes, or network nodes.

In traditional wireless telecommunications systems, transmission equipment in a base station transmits signals throughout a geographical region known as a cell. As technology has evolved, more advanced equipment has been introduced that can provide services that were not possible previously. This advanced equipment might include, for example, an enhanced node B (eNB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). additional characteristics to LTE systems/equipment will eventually result in an LTE advanced (LTE-A) system. As used herein, the term "access device" will refer to any component, such as a traditional base station or an LTE or LTE-A access device, that can provide a UA with access to other components in a telecommunications system.

In mobile communication systems such as the enhanced universal terrestrial radio access network (E-UTRAN), an access device provides radio access to one or more UAs. The access device comprises a packet scheduler for dynamically scheduling downlink traffic data packet transmissions and allocating uplink traffic data packet transmission resources among all the UAs communicating to the access device. The functions of the scheduler include, among others, dividing the available air interface capacity between UAs, deciding the transport channel to be used for each UA's packet data transmissions, and monitoring packet allocation and system load. The scheduler dynamically allocates resources for Physical Downlink Shared CHannel (PDSCH) and Physical Uplink Shared CHannel (PUSCH) data transmissions, and sends scheduling information to the UAs through a scheduling channel.

Several different data control information (DCI) message formats are used by LTE access devices to communicate data packet resource assignments to UAs including, among others, DCI formats 1 and 1A. An access device selects one of the downlink DCI formats for allocating resources to a UA as a function of several factors including UA and access device capabilities, the amount of data to transmit to a UA, the amount of communication traffic within a cell, channel conditions, etc. UAs refer to the scheduling/resource allocation information for the timing and the data rate of uplink and downlink transmissions and transmit or receive data packets accordingly. DCI formatted control data packets are transmitted via the Physical Downlink Control CHannel (PDCCH).

Hybrid Automatic Repeat reQuest (HARQ) is a scheme for re-transmitting a traffic data packet to compensate for an incorrectly received traffic packet. A HARQ scheme is used both in uplink and downlink in LTE systems. Take downlink transmissions for example, for each downlink packet received by a UA, a positive acknowledgment (ACK) is transmitted on a Physical Uplink Control Channel (PUCCH) from the UA to the access device after a cyclic redundancy check (CRC) performed by the UA indicates a successful decoding. If the CRC indicates a packet is not received correctly, a UA HARQ entity transmits a negative acknowledgement (NACK) on the PUCCH in order to request a retransmission of the erroneously received packet. Once a HARQ NACK is transmitted to an access device, the UA waits to receive a retransmitted traffic data packet. When a retransmission request is received at an access device, the access device retransmits the incorrectly received packet to the UA. This process of transmitting, ACK/NACK and retransmitting continues until either the packet is correctly received or a maximum number of retransmissions has occurred. Hereinafter the process of transmitting a NACK, waiting for a retransmitted packet and attempting to decode the retransmitted packet will be referred to as a HARQ process.

In many cases it is desirable for an access device to transmit a large amount of data to a UA in a short amount of time. For instance, a video cast may include large amounts of audio and video data that has to be transmitted to a UA over a short amount of time. As another instance, a UA may run several applications that all have to receive data packets from an access device essentially simultaneously so that the combined data transfer is extremely large.

One way to increase the amount of data that can be transmitted during a short period is to have an access device commence several (e.g., five) data packet transmission processes in parallel. To facilitate a HARQ scheme for each of a plurality of simultaneous packet transmissions, access devices and UAs are programmed to support parallel HARQ processes. To this end, each DCI formatted downlink resource grant on the PDCCH includes a three bit HARQ process number (HPN) or HARQ process indicator (HPI) corresponding to an associated data packet. When a data packet is not correctly received, the incorrectly received packet and associated HPI are stored by the HARQ entity in a HARQ decoding buffer and a NACK is transmitted back to the access device to request retransmission of the data packet. The access device retransmits the data packet along with the HPI associated with the original transmitted data packet to the UA. When the retransmitted packet and HPI are received, the UA delivers the retransmitted packet to the HARQ process associated with the received HPN. The HARQ process attempts to decode the combined packet data and the HARQ process continues. Where the HPI is three bits, the maximum number of simultaneous HARQ processes is eight.

Another way to increase the rate of data transmission is to use multiple carriers (i.e., multiple frequencies) to communicate between an access device and UAs. Where transmission rate is increased via use of multiple carriers, the number of separate HARQ processes required to manage additional data should also be increased. Currently there are two known ways to increase the number of uniquely identifiable HARQ processes in a multiple carrier system. First, where multiple carriers are used, the UA HARQ entity can simply maintain separate HARQ processes for each of the carrier frequencies in the usual fashion where the access device retransmits data packets using the same carrier as an original incorrectly received packet. For instance, where the DCI format includes a three bit HPI and an access device and UA use four carriers, the access device and UA may facilitate eight separate HARQ processes for each of the four carriers for a total of thirty-two separate HARQ processes.

Second, where multiple carriers are used, the number of bits in the DCI format for specifying the HPI can be increased and the HPI s can be shared across all carriers (i.e., any data packet can be retransmitted on any carrier irrespective of the associated HPI). For instance, where the HPI is five bits instead of three and an access device and UA use four carriers, the UA can facilitate thirty-two separate HPI processes and each HPI can be facilitated using any of the carriers.

While each of the two solutions for increasing the number of supportable HARQ processes in a multiple carrier system has some advantages, each solution has at least one important shortcoming. The first solution that uses a three bit HPI is advantageous because existing DCI formats and downlink communication packets can be used which means that the control channel processing will be backward compatible with single carrier UAs. However, this three bit HPI solution limits access device scheduling flexibility as each HPI can only be used with a single one of the carriers.

The second solution that uses HPIs that include more than three bits enables more flexible scheduling of retransmissions as any carrier can be used to retransmit packets. However, this second solution requires a change to the DCI format and subsequent packets to accommodate the four plus bit HPI s. Changing DCI formats creates issues relating to backward compatibility with three bit HPI UAs and consequently increases hypothesis testing.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
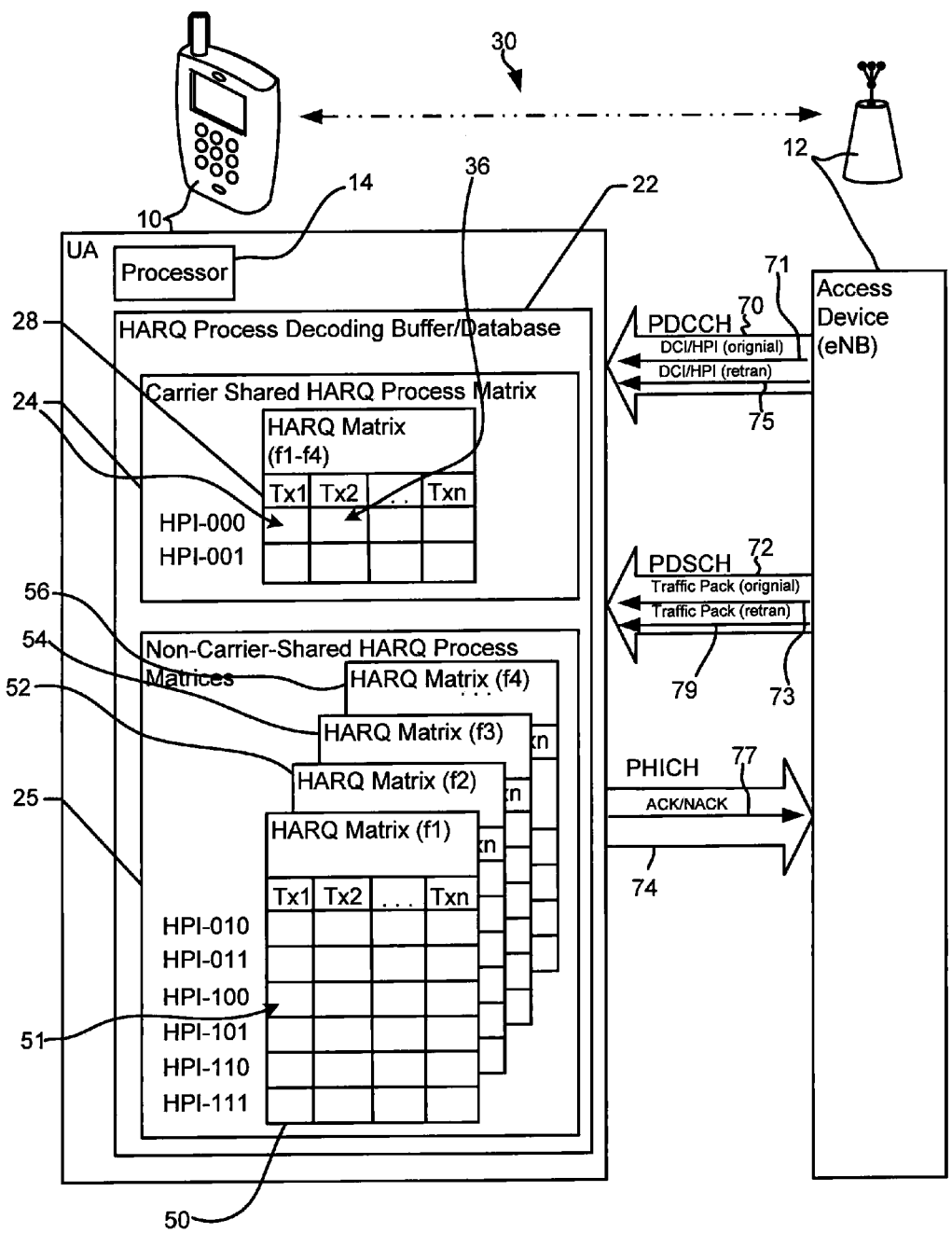
FIG. 1 is a schematic diagram showing components of a communication system including a user agent that includes a HARQ process decoding buffer/database.

It has been recognized that in a multicarrier communication system that supports Hybrid Automatic Repeat reQuest (HARQ) processes, a balance between flexibility and backward compatibility in managing HARQ processes can be achieved by, without changing the downlink control channel (PDCCH) structure, designating a subset of HARQ process numbers (HPNs) or HARQ process indicators (HPIs) as shared and another subset as frequency dedicated. Here, shared HPIs can be used on any frequency and uniquely designate HARQ processes irrespective of the carrier frequency on which the HPI is used while the HARQ process associated with a dedicated HPI depends on the carrier frequency on which the HPI is used. For instance, in at least some embodiments where a system includes four carriers and HPIs are three bit so that eight different HPIs can be specified, two of the HPIs (e.g., 000 and 001) may be designated as shared while the other six HPIs (e.g., 010, 001, 100, 101, 110 and 111) are dedicated so that there are twenty-four dedicated HPI-channel combinations (e.g., 6 HPI×4 separate channels) and two shared HPIs. In this manner, legacy communication systems that use three bit HPI do not have to be modified to support multiple carrier communications, with respect to control channel processing, while the shared HPI facilitate additional flexibility at the access device.

At least some embodiments include a method for use with a mobile user agent, the method for managing Hybrid Automatic Repeat reQuest (HARQ) processes in a multi carrier communication system that uses HARQ process indicators (HPIs) to manage HARQ processes, the method comprising the steps of, within the mobile user agent, designating a first subset of the HPIs as shared HPIs wherein each shared HPI designates a HARQ process irrespective of which of a plurality of system carrier frequencies are used to transmit a traffic packet and designating a second subset of the HPIs as non-carrier-shared HPIs wherein each non-carrier-shared HPI, in conjunction with the carrier frequency used to transmit a traffic packet, designates a carrier frequency unique HARQ process.

In some cases the method further includes the steps of receiving an HPI at the mobile user agent, receiving a first traffic packet via a carrier frequency at the user agent that is associated with the HPI, where the HPI is a first subset HPI, (i) using the HPI to identify a HARQ process associated with the first traffic packet irrespective of the carrier frequency used to transmit the traffic packet and (ii) providing the first traffic packet to the identified HARQ process, where the HPI is a second subset HPI, (i) using the HPI and the carrier frequency on which the first traffic packet was received to identify a carrier frequency specific HARQ process associated with the first traffic packet and (ii) providing the first traffic packet to the carrier frequency specific HARQ process.

In some embodiments the first traffic packet is received on a first carrier frequency and a first HPI associated with the first traffic packet includes a first subset HPI, the method further including the steps of receiving a second traffic packet at the mobile user agent on a second carrier frequency where an HPI associated with the second traffic packet is the first HPI and, providing the second traffic packet to the HARQ process that received the first traffic packet.

In some cases the method further includes the steps of receiving third and fourth traffic packets via the first and second carrier frequencies, respectively, where each of the third and fourth traffic packets are associated with a third HPI and wherein the third HPI is a second subset HPI and providing the third and fourth traffic packets to separate HARQ processes. In some cases the system uses four carrier frequencies and the HPIs include eight distinct HPIs. In some embodiments the first subset includes two HPIs and the second subset includes six HPIs.

In some cases the method further includes the steps of, prior to the steps of designating, receiving an HPI configuration message at the user agent indicating shared and non-shared HPI, the steps of designating including using the HPI configuration message information to designate the shared and non-shared HPI in a user agent HARQ process buffer.

Some embodiments include a method for use with a mobile user agent, the method for managing Hybrid Automatic Repeat reQuest (HARQ) processes in a multicarrier communication system that uses HARQ process indicators (HPIs) to manage HARQ processes, the method comprising the steps of, within the mobile user agent, designating a first subset of the HPIs as shared HPIs wherein each shared HPI designates a HARQ process irrespective of which of at least first and second carrier frequencies are used to transmit a traffic packet and designating a second subset of the HPIs as non-carrier-shared HPIs wherein each non-carrier-shared HPI, in conjunction with the single carrier frequency used to transmit a traffic packet, designates a carrier frequency unique HARQ process.

In some cases the method further includes receiving an HPI at the mobile user agent, receiving a first traffic packet via a carrier frequency at the user agent that is associated with the HPI, where the HPI is a first subset HPI and the carrier frequency on which the first traffic packet is received is one of the at least a first and second carrier frequencies (i) using the HPI to identify a HARQ process associated with the first traffic packet and at least the first and second carrier frequencies and (ii) providing the traffic packet to the identified HARQ process, where the HPI is a second subset HPI, (i) using the HPI and the carrier frequency on which the first traffic packet was received to identify a carrier frequency specific HARQ process associated with the first traffic packet and (ii) providing the first traffic packet to the carrier frequency specific HARQ process.

Some embodiments include a method performed by a user agent, the method comprising (a) designating one carrier as an anchor carrier, (b) designating a plurality of carriers as assigned carriers, wherein at least one of the plurality of assigned carriers is designated as an inactive carrier and (c) receiving a command on a control channel of the anchor carrier, the command resulting in changing the designation of at least one of the at least one inactive assigned carriers to an active assigned carrier.

In some embodiments the command is a PDCCH for a DCI packet including a particular HPI. In some cases the method further comprises the step of changing the designation of the active assigned carrier to an inactive assigned carrier after a timer expires. In some embodiments the method further includes the steps of, prior to the steps of designating, receiving an HPI configuration message at the user agent indicating anchor and assigned carriers, the steps of designating including using the HPI configuration message information to designate the anchor and assigned carriers.

In some cases the a method is to be performed by a user agent, the method comprising the steps of (a) performing capability negotiations with an access device using three bit HPI to identify a DCI format/communication protocol and corresponding maximum HPI bit count and (b) where the maximum HPI bit count is greater than three, communicating using the maximum HPI bit count.

In some cases an embodiment includes a mobile user agent for use in a multi-carrier communication system comprising a processor programmed to perform the steps of, designating a first subset of the HPIs as shared HPIs wherein each shared HPI designates a HARQ process irrespective of which of a plurality of system carrier frequencies are used to transmit a traffic packet and designating a second subset of the HPIs as non-carrier-shared HPIs wherein each non-carrier-shared HPI, in conjunction with the carrier frequency used to transmit a traffic packet, designates a carrier frequency unique HARQ process.

In some embodiments the processor is further programmed to perform the steps of receiving an HPI at the mobile user agent, receiving a first traffic packet via a carrier frequency at the user agent that is associated with the HPI, where the HPI is a first subset HPI, (i) using the HPI to identify a HARQ process associated with the first traffic packet irrespective of the carrier frequency used to transmit the traffic packet and (ii) providing the first traffic packet to the identified HARQ process, where the HPI is a second subset HPI, (i) using the HPI and the carrier frequency on which the first traffic packet was received to identify a carrier frequency specific HARQ process associated with the first traffic packet and (ii) providing the first traffic packet to the carrier frequency specific HARQ process.

In some embodiments the first traffic packet is received on a first carrier frequency and a first HPI associated with the first traffic packet includes a first subset HPI, the processor further programmed to perform the steps of receiving a second traffic packet at the mobile user agent on a second carrier frequency where an HPI associated with the second traffic packet is the first HPI and, providing the second traffic packet to the HARQ process that received the first traffic packet.

Other embodiments include a user agent for use in a communication network, the user agent comprising a processor programmed to perform the steps of (a) designating one carrier as an anchor carrier, (b) designating a plurality of carriers as assigned carriers, wherein at least one of the plurality of assigned carriers is designated as an inactive carrier and (c) receiving a command on a control channel of the anchor carrier, the command resulting in changing the designation of at least one of the at least one inactive assigned carriers to an active assigned carrier.

In some embodiments the command is a PDCCH for a DCI packet including a particular HPI. In some embodiments the processor is further programmed to perform the steps of changing the designation of the active assigned carrier to an inactive assigned carrier after a timer expires.

Some embodiments include a user agent for use in a communication system wherein the user agent comprises a processor programmed to perform the steps of (a) performing capability negotiations with an access device using three bit HPI to identify a DCI format/communication protocol and corresponding maximum HPI bit count and (b) where the maximum HPI bit count is greater than three, communicating using the maximum HPI bit count.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

The various aspects of the subject invention are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Referring now to the drawings wherein like reference numerals correspond to similar elements throughout the several views and more specifically, referring to FIG. 1, FIG. 1, is a schematic diagram illustrating a multi-channel communication system 30 including a user agent (UA) 10 and an access device 12. UA 10 includes, among other components, a processor 14 that runs one or more software programs wherein at least one of the programs communicates with access device 12 to receive data from, and to provide data to, access device 12. When data is transmitted from UA 10 to device 12, the data is referred to as uplink data and when data is transmitted from access device 12 to UA 10, the data is referred to as downlink data.

To facilitate communications, a plurality of different communication channels are established between access device 12 and UA 10. For the purposes of the present disclosure, referring to FIG. 1, the important channels between access device 12 and UA 10 include a Physical Downlink Control CHannel (PDCCH) 70, a Physical Downlink Shared CHannel (PDSCH) 72 and a Physical Uplink Control CHannel (PUCCH) 74. As the label implies, the PDCCH is a channel that allows access device 12 to control UA 10 during downlink data communications. To this end, the PDCCH is used to transmit scheduling or control data packets referred to as downlink control information (DCI) packets to the UA 10 to indicate scheduling to be used by UA 10 to receive downlink communication traffic packets (i.e., non-control data to be used by applications run by UA 10). A separate DCI packet is transmitted by access device 12 to UA 10 for each of traffic packet transmitted. In addition to including information indicating scheduling for an associated traffic packet, a DCI packet includes a HARQ process indicator (HPI) that can be used to facilitate a HARQ process, if necessary, for the traffic packet.

Exemplary DCI formats including format 1 and format 1A currently used in the E-UTRAN are described at sections 5.3.3.1.2 and 5.3.3.1.3 of 3 GPP TS 36.212 V8.3.0 (2008-05) where it can be seen that the HPI/HPN for FDD currently comprises a three-bit field. Thus, the HPI can have eight distinct values. Exemplary DCI packets are indicated by communications 71 and 75 on PDCCH 70 in FIG. 1.

In FIG. 1, exemplary traffic data packets on PDSCH 72 are labeled 73 and 79. In at least some embodiments a traffic packet will be transmitted via the same carrier (i.e., the same frequency) as an associated DCI packet.

Referring to FIG. 1, the PUCCH 74 (in some cases a Physical Uplink Shared CHannel (PUSCH) may be used for the uplink ACK/NACK functionality) is used by UA 10 to transmit acknowledgement (ACK) and negative acknowledgement (NACK) signals (see 77 in FIG. 1) to access device 12 for each of the traffic packets received to indicate either correct or incorrect packet reception, respectively. Where a traffic packet is not received correctly and a NACK is transmitted back to access device 12, access device 12 typically transmits another DCI packet (see 75 in FIG. 1) and retransmits the incorrectly received traffic packet (see packet 79 in FIG. 1) to UA 10.

Referring still to FIG. 1, UA processor 14 maintains a HARQ process decoding buffer/database 22 in which incorrectly received data packets are stored along with information that uniquely identifies one of a plurality of HARQ processes associated with the incorrectly received packet(s). To this end, exemplary buffer/database 22 includes a plurality of HARQ process matrices 28, 50, 52, 54 and 56. Exemplary matrix 50 includes six separate rows labeled HPI-010 through HPI-111 in which incorrectly received traffic packets may be stored. Thus, for example, where an original traffic packet is incorrectly received, that packet would be stored, a second incorrectly received traffic packet (i.e., a packet retransmitted a first time) would be combined with the first and then stored, and so. As illustrated, matrix 50 corresponds to a first carrier frequency f1. Thus, only incorrectly received traffic packets received on the first carrier frequency f1 are stored in matrix 50. Similarly, matrices 52, 54, and 56 are associated with carrier frequencies f2, f3, and f4, and therefore, only incorrectly received traffic packets associated with carrier frequencies f2, f3 and f4 are stored in matrices 52, 54 and 56, respectively. Although not illustrated, each of matrices 52, 54 and 56 includes six rows just like matrix 50, where the rows correspond to HPIs 010, 011, 100, 101, 110 and 111, respectively.

Thus, for each of the HPIs 101, 011, 100, 101, 110 and 111, which matrix an incorrect traffic packet is stored in is a function of the carrier frequency used to transmit the traffic packet to UA 10. For this reason, matrices 50, 52, 54 and 56 are referred to collectively as non-carrier-shared process matrices 25.

Referring yet again to FIG. 1, the fifth HARQ process matrix 28 includes first and second rows corresponding to HPIs 000, 001, respectively. Thus, an original traffic packet which is incorrectly received may be stored, an incorrectly received retransmitted packet associated with the original incorrectly received packet may be combined with the first and then stored. Here, unlike the non-carrier-shared HARQ process matrices 50, 52, 54 and 56, matrix 28 is a shared HARQ process matrix wherein incorrectly received packets on all carriers f1 through f4 are included in the same matrix 28 irrespective of the carrier used to transmit the packet. For example, where an original packet and a subsequently retransmitted related packet are both associated with HARQ process indicator 000 and are received by UA 10 via first and second different carriers (e.g., f1, f4), the incorrectly received original and retransmitted packets are combined and then stored in matrix 28 in field 36 associated with HPI 000. Thus, in this example, access device 12 can provide HPIs to UA 10 to enable UA 10 to manage HARQ processes without having to change the DCI format to accommodate more than three bits HPIs and still has the flexibility, at least with respect to HPIs 000 and 001, to use any of the four system supported carrier frequencies f1 through f4.

It should be appreciated that, while the example here includes six non-carrier-shared HPI values and two carrier shared HPI values, other combinations of shared and non-carrier-shared HPIs are contemplated. Thus, in some cases it may be desirable to have four carrier-shared and four non-carrier-shared HPIs or two non-carrier-shared and six carried shared HPIs. To configure buffer/database, it is contemplated that in at least some embodiments access device 12 (see again FIG. 1) may be programmed to transmit an HPI configuration message to UA 10 indicating shared and non-shared HPI. For instance, an exemplary HPI configuration message may include a 19 bit field where the first sixteen bits indicate a specific UA 10 and the last three bits indicate one of eight three bit combinations. Here, UA 10 may be programmed to interpret the last three bits as indicating that all HPI associated with bit combinations smaller than and including the three bit combination should be treated as shared HPI. For instance, where the last three bits include 000, HPI 000 would be treated as shared while the balance of HPI including 001 through 111 would be treated as non-shared. Similarly, where the last three bits include 001, HPI 000 and 001 would be treated as shared while the balance of HPI including 010 through 111 would be treated as non-shared. Other HPI configuration messages are contemplated. In at least some embodiments the HPI configuration message may be transmitted via the Radio Resource Control (RRC) layer, the broadcast control channel or the MAC control elements of E-UTRAN that are associated with the radio interface.

In other embodiments it is contemplated that the HPI configuration message may be periodically broadcast from an access device 12 to all UAs in the vicinity to configure HPI buffers as with shared and non-shared HPI matrices. Here, the shared and non-shared configuration may be altered by an access device 12 periodically to optimally address conditions throughout a communication system.

Figure 2:
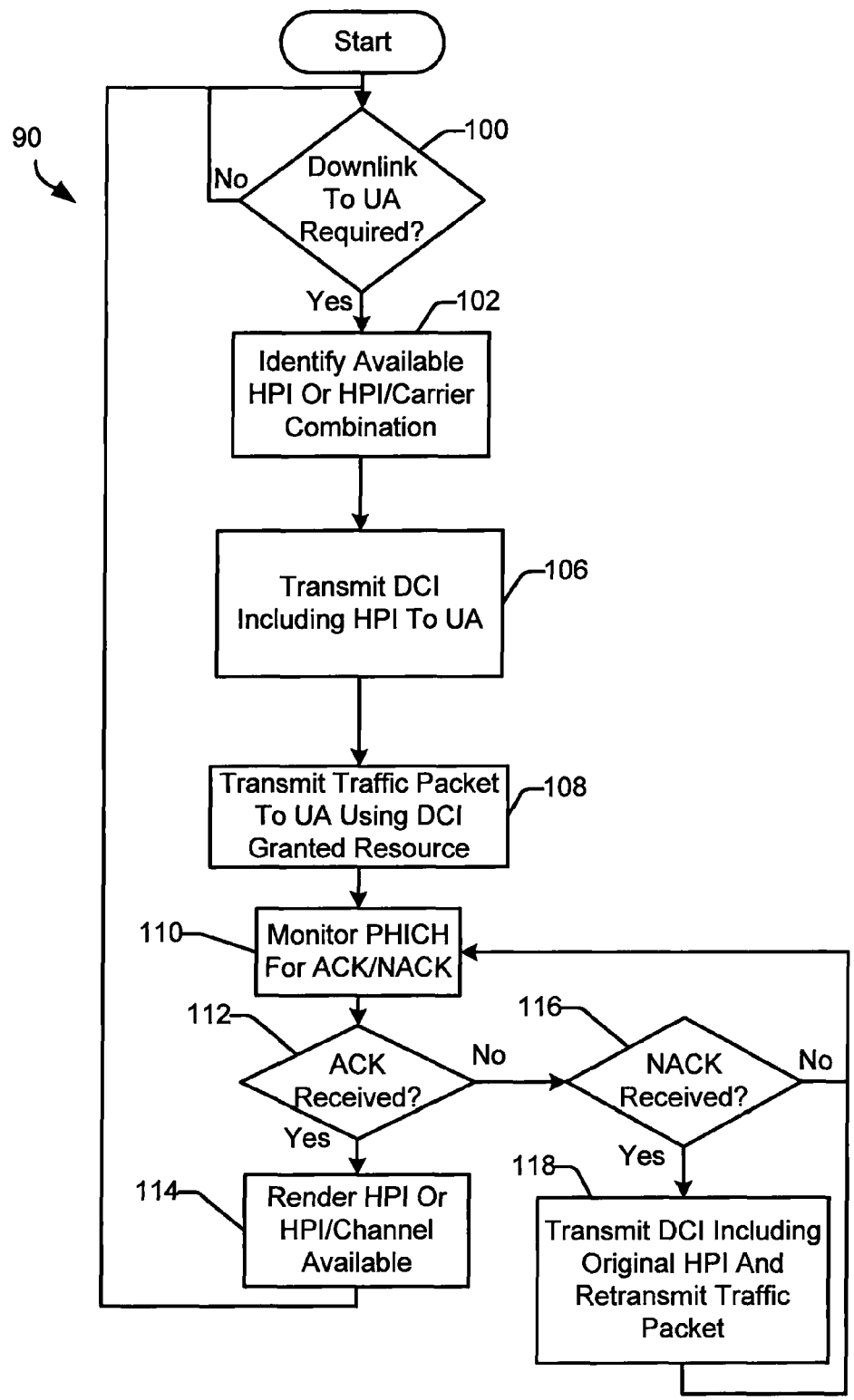
FIG. 2 is a flow chart illustrating a process that may be performed by the access device of FIG. 1 to enable the user agent of FIG. 1 to manage HARQ process numbers.

Referring now to FIG. 2, a process 90 performed by access device 12 for facilitating HARQ process management by UA 10 is illustrated. At decision block 100, access device 12 determines whether or not downlink data transmission to UA 10 is required. Where downlink transmission is not required, control continues to loop back through decision block 100. Once downlink transmission is required, control passes to block 102 where access device 12 identifies an available HPI or HPI/carrier combination. Here, it should be appreciated that access device 12 keeps track of HPIs or HPI/carrier combinations currently being used with UA 10 to track previously transmitted traffic packets. At block 102, access device 12 selects one of the available (i.e., currently unused) HPI or HPI/carrier combinations. Continuing and referring also to FIG. 1, at process block 106, access device 12 creates and transmits a DCI packet 71 including the HPI identified at block 102 to the UA 10. Where the available HPI selected is a carrier shared HPI, the access device selects anyone of the carrier frequencies for the DCI packet. Where the available HPI is a non-carrier shared HPI, the access device 12 selects a specific one of the carriers associated with the HPI for the DCI packet. At process block 108, access device 12 transmits a traffic packet to UA 10 (see 73 in FIG. 1) using the DCI specific schedule and the selected carrier frequency and at block 110 access device 12 monitors the PUCCH for an ACK or a NACK. At block 112, when an ACK is received (see 77 in FIG. 1), control passes to block 114 where access device 12 renders the HPI or HPI/channel combination associated with the received ACK available. After block 114, control passes back up to block 100.

Referring still to FIGS. 1 and 2, at block 112, if an ACK is not received, control passes to block 116 where access device 12 determines whether or not a NACK has been received. Where no NACK has been received, control passes to block 110 where access device 12 continues to monitor the PUCCH for an ACK or a NACK. At block 116, where a NACK has been received, control passes to block 118 where access device 12 transmits another DCI packet (see 75 in FIG. 1) including the original HPI and retransmits the traffic packet (see 79 in FIG. 1) incorrectly received by the UA 10. After block 118, control passes back to block 110 to monitor for another ACK/NACK. The FIG. 3 process is performed for each original traffic packet to transmit to a UA and multiple processes like process 90 may be performed simultaneously.

Figure 3:
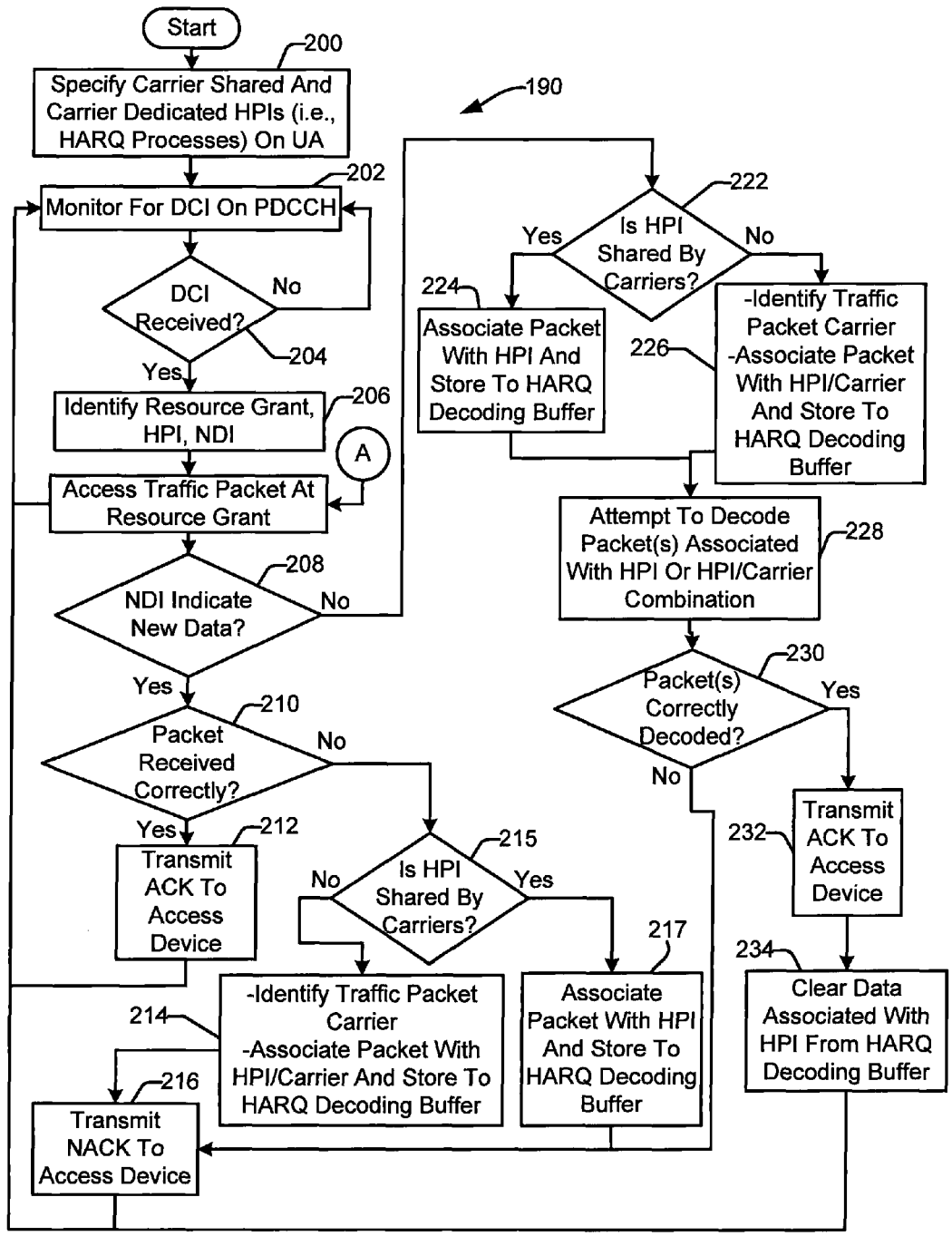
FIG. 3 is a flow chart illustrating a process that may be performed by the user agent of FIG. 1 to manage HARQ process numbers.

Referring now to FIG. 3, a process 190 performed by the UA processor 14 in FIG. 1 for managing HARQ processes is illustrated. Process 190 is performed, in part, in parallel with the process shown and described above with respect to FIG. 2. Referring also to FIG. 1, at process block 200 carrier shared and carrier dedicated HPIs are defined or specified for a HARQ management application/entity on UA 10. As shown in FIG. 1, in the exemplary embodiment, the carrier shared HPIs include 000 and 001 that are associated with HARQ matrix 28 and that are shared among each of the four frequencies f1 through f4. The exemplary non-carrier-shared HPIs in FIG. 1 include HPIs 010, 011, 100, 101, 110 and 111, each of which, in combination with a specific one of the carrier frequencies f1, f2, f3 or f4, uniquely identifies a HARQ process.

Referring still to FIGS. 1 and 3, at decision block 202, UA processor 14 monitors the PDCCH for a DCI packet. At block 204, once a DCI packet is received (see 71 in FIG. 1), control passes to block 206 where UA processor 14 identifies the downlink resource scheduled in the DCI packet. Here, in addition to identifying the downlink resource scheduled, processor 14 can use the DCI packet information to determine whether or not the traffic packet associated with the resource grant is new data or retransmitted data by examining a new data indicator (NDI) which is provided for that purpose. In addition, at block 206, processor 14 can identify the HPI specified by the DCI packet information. At block 207, processor 14 accesses the traffic packet transmitted (see 73 in FIG. 1) to the UA 10 via the resource grant identified at block 206.

At decision block 208, processor 14 determines whether or not the NDI in the DCI indicates new data. Where the NDI indicates new data, control passes to decision block 210 where processor 14 determines whether or not the new data or original traffic packet was received correctly. Where the original traffic packet is received correctly, at block 212, processor 14 transmits an ACK (see 77 FIG. 1) back to access device 12 after which control passes back up to block 202 where processor 14 continues to monitor for new DCI on the PDCCH.

Referring to FIGS. 1 and 3, at decision block 210, if the original traffic packet is incorrectly received, control passes to block 215 where processor 14 determines whether or not the HPI specified by the DCI is shared by the carriers or is non-carrier-shared. Again, in the present example illustrated in FIG. 1, HPIs 000 and 001 are both shared carriers while HPIs 010, 011, 100, 101, 110 and 111 are all non-carrier-shared. Where the HPI is shared by carriers, control passes to block 217 where the incorrectly received original packet is associated with the shared HPI and is stored to the HARQ decoding buffer in the appropriate shared HARQ process matrix 28. For instance, in the example illustrated in FIG. 1, where a DCI specified HPI includes shared HPI 000, regardless of which frequency was used to transmit the traffic packet to UA 10, at block 217 (see again FIG. 3) the incorrectly received original packet is stored in field 24 corresponding to HPI 000. After block 217, control passes to block 216 where processor 14 transmits a NACK to access device 12 thereby requesting that access device 12 retransmit the original traffic packet. After block 216, control passes back up to block 202.

Referring once again to FIGS. 1 and 3, at block 215, where the HPI is a non-carrier-shared HPI, control passes to block 214 where processor 14 identified the carrier used to transmit the received traffic packet and the incorrectly received original packet is associated with the HPI specified by the DCI and the traffic packet carrier combination, and the packet is stored in the appropriate HARQ decoding buffer (i.e., the buffer associated with the HPI/carrier combination). For instance, consistent with the above example described with respect to FIG. 1, where the HPI is 100 and therefore is a non-carrier-shared HPI and the traffic packet carrier frequency is f1, the incorrectly received original traffic packet is stored to field 51 corresponding to HPI 100 in matrix 50 that is associated with frequency f1. After block 214, control passes to block 216 where processor 14 transmits a NACK (see 77 in FIG. 1) to access device 12 after which control passes back up to block 202.

Referring yet again to FIGS. 1 and 3, at block 208, where the NDI indicates a retransmitted packet, control passes to block 222. At block 222, processor 14 determines whether or not the HPI is shared or non-carrier-shared. Where the HPI is shared by the carriers, control passes to block 224 where the retransmitted packet is associated with the shared HPI and is stored to the appropriate HARQ decoding buffer. Again, consistent with the FIG. 1 example, where the HPI is 000 and therefore is a shared HPI, the retransmitted packet is combined with the original packet and stored in the HPI 000 row in matrix 28. After block 224, control passes to block 228.

Referring again to decision block 222, where the HPI non-carrier-shared, control passes to block 226 where processor 14 identifies the carrier used to transmit the received traffic packet and the retransmitted packet is associated with the HPI specified in the DCI and the traffic packet carrier combination and the packet is stored to the carrier specific HARQ matrix in buffer 22. After block 226, control passes to block 228.

Referring still to FIGS. 1 and 3, at block 228, processor 14 uses all of the packets (i.e., the original packet and any retransmitted packets) stored in the HARQ process decoding buffer 22 that are associated with the HPI and carrier combination or the HPI (in the case of carrier shared HPIs) to attempt to decode the related packets. At block 230, where the packets are correctly decoded, control passes to block 232 where processor 14 transmits an ACK (see 77 in FIG. 1) to access device 12 indicating that the data associated with the correctly decoded packets has been correctly received. At block 234, processor 14 clears the data associated with the HPI or HPI/carrier combination from the HARQ decoding buffer so that the HPI or HPI/carrier combination can be used thereafter to track a subsequent HARQ process. In the alternative, in at least some embodiments, it is contemplated that the clearing step 234 would not be performed and instead that the HPI or HPI/carrier combination would simply be reused when access device 12 transmits a subsequent DCI indicating new data (via the NDI) and specifying the HPI or HPI/carrier combination. Where the packets are not correctly decoded at block 230, control passes back to block 216 where UA 10 transmits a NACK to access device 12 thereby requesting that the original packet again be retransmitted.

Where a communication system employs multiple carriers, UA battery power can be conserved by controlling the UA to only monitor a subset of the carriers when certain operating characteristics occur. For example, where a communication system employs four carrier frequencies f1, f2, f3 and f4, during a low traffic operation, it may be that only one of the four carriers has to be used for downlink purposes so that the other three frequencies need not be monitored. To this end, systems already have been contemplated wherein a UA 10 can monitor one anchor carrier routinely during low traffic operation and, when conditions warrant, may be controlled to monitor more than one or all of the carriers to facilitate faster download of data. Here, one requirement is to provides some way for an access device 12 (see again FIG. 1) to indicate to a UA 10 when multiple carriers should be monitored. It has been recognized that a shared HPI can be used as an indicator to a UA 10 to monitor multiple carriers.

Figure 4:
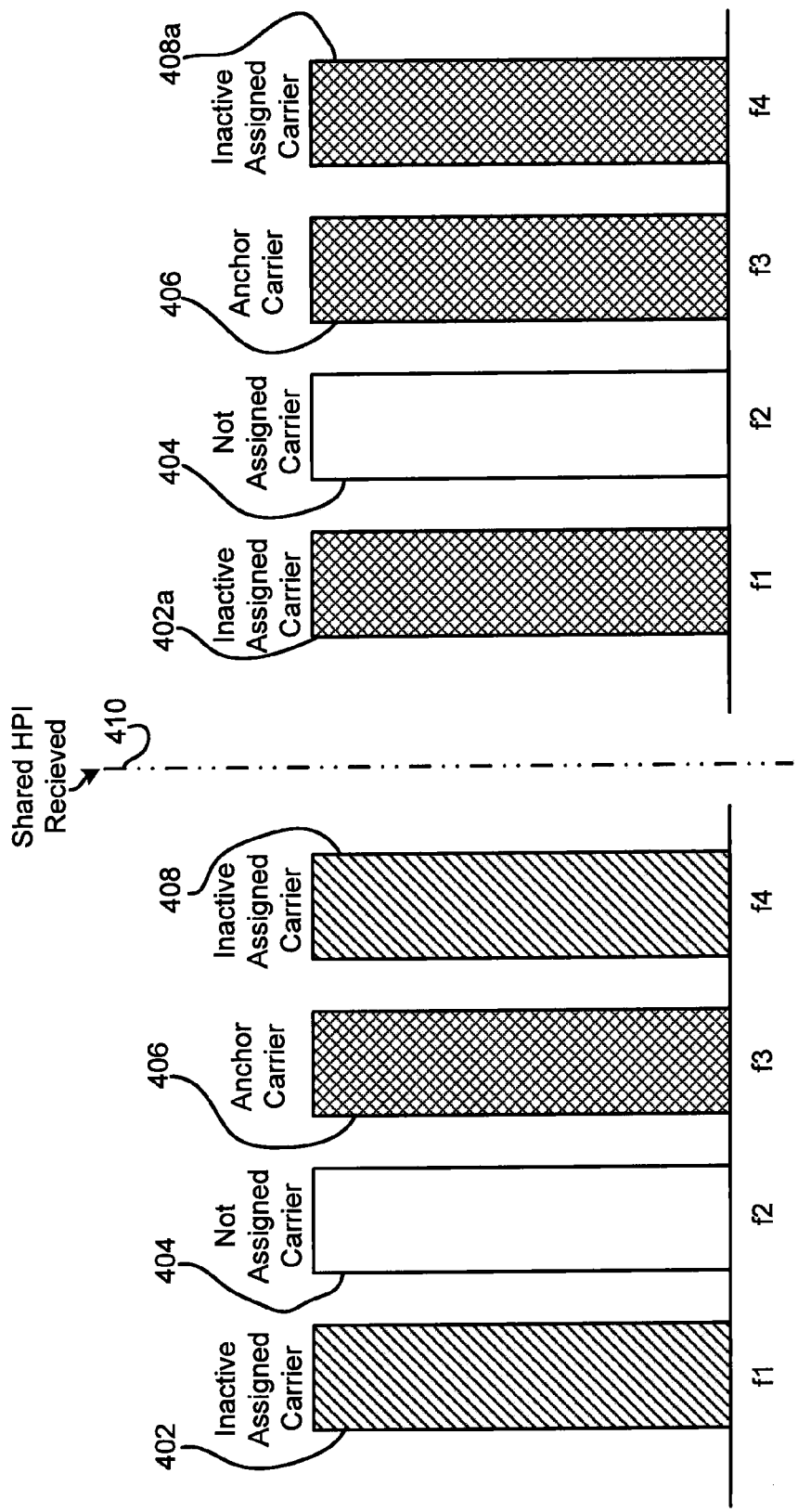
FIG. 4 is a schematic diagram illustrating carrier states before an after a shared HARQ process indicator is received that are consistent with at least one aspect of the present disclosure.

Referring now to FIG. 4, consistent with the above comments, four carriers 402, 404, 406 and 408 that are used within an exemplary communication system are illustrated. The carriers corresponding to frequencies f1, f2, f3 and f4, respectively. As shown, carrier 406 corresponding to frequency f3 is referred to as an anchor carrier meaning that carrier 406 is the only carrier routinely monitored by UA 10. Carriers 204 and 208 corresponding to frequencies f1 and f4 are designated as inactive assigned carriers meaning that these are carriers that are assigned by the access device 12 to UA 10 where the carriers are initially designated as inactive. However, after UA 10 receives a command on the control channel of anchor carrier 406, the assigned carriers become active assigned carriers as shown at 402a and 408a in FIG. 4. Once an assigned carrier becomes active, the UA 10 begins to monitor the control channels on the active assigned carriers as well as monitoring the anchor carrier control channel. The "not assigned" carrier 404 corresponding to frequency f2 is ignored by the UA 10 until the UA 10 is explicitly instructed to reclassify the carrier 404 as an assigned carrier.

Referring still to FIG. 4, according to another aspect of at least some embodiments of the present disclosure, when UA 10 receives a control channel message on the anchor carrier 406 that contains one of the shared HARQ process numbers (e.g., 000 or 001 in the FIG. 1 example), the UA processor 14 begins to monitor the control channels on the assigned carriers so the assigned carriers all become active as indicated at 402*a* and 408*a* in FIG. 4. In FIG. 4, reception of a shared HPI is indicated at time 410.

After assigned carriers have been rendered active, it is contemplated that conditions may occur in which the UA 10 should revert back to monitoring only the anchor carrier and therefore the assigned carriers should again be rendered inactive. In at least some embodiments it is contemplated that, after assigned carriers are rendered active, if a threshold time period occurs without any control channel messages on the assigned carriers, UA 10 may be programmed to automatically inactivate the assigned carriers so that only the anchor carrier is monitored.

Referring now to FIG. 5 and again to FIG. 1, a method 500 by which UA 10 activates and deactivates carriers as a function of shared HPI is illustrated. At block 502, UA processor 14 designates anchor, assigned and not assigned carriers. Here, the designation step 502 may be controlled by access device 12. At block 504, a maximum timer value is set. At block 506, UA processor 14 monitors the anchor carrier PDCCH for a DCI packet including a shared HPI. At decision block 508, where a DCI packet is received, control passes to block 510 where the DCI is processed. At block 512, the DCI HPI is identified. At block 514, where the HPI is non-carrier-shared control passes back up to block 506 where monitoring of the anchor carrier PDCCH continues. At block 514, where the HPI is shared, control passes to block 516 where a timer is started.

Figure 5:
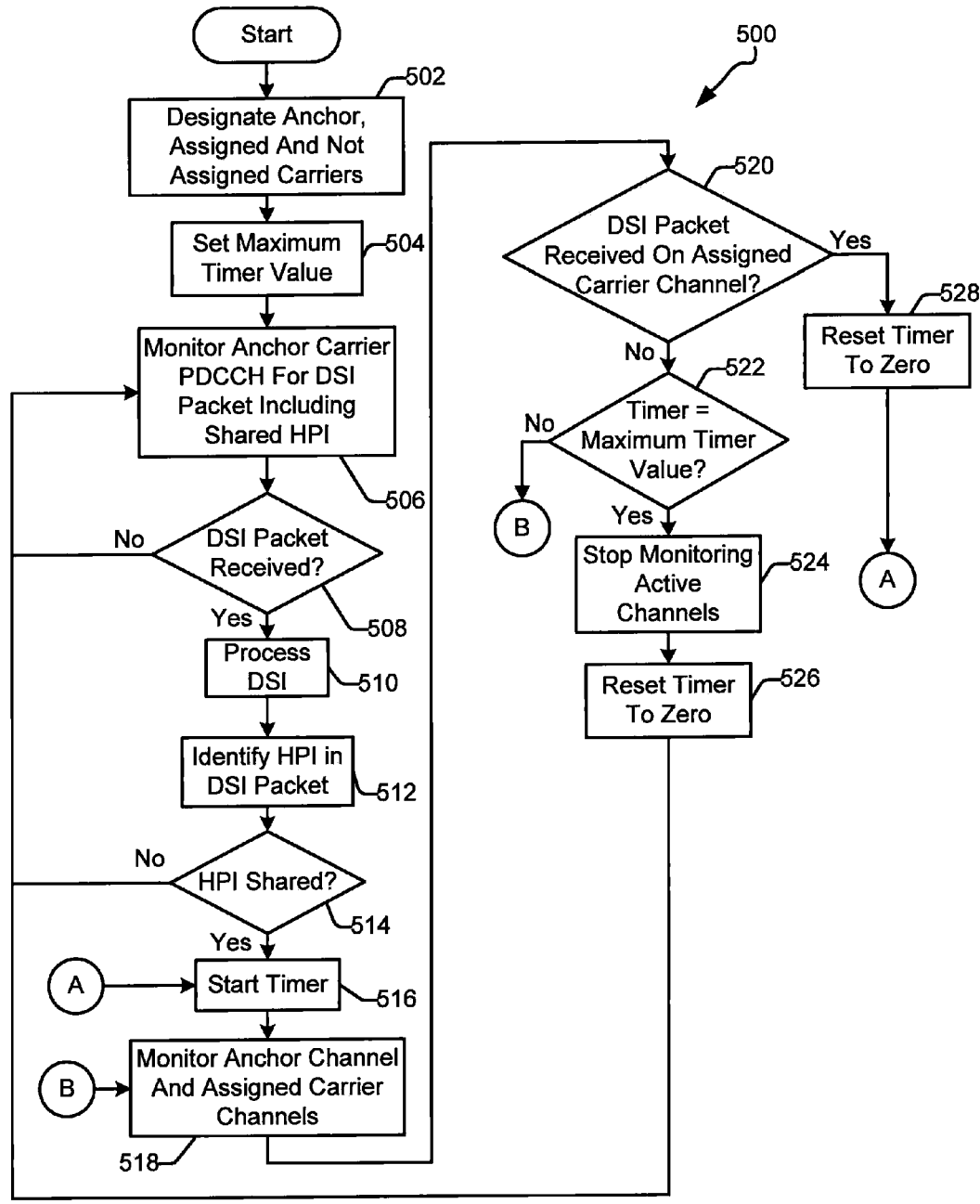
FIG. 5 is a flow chart illustrating a process that may be performed by the user agent of FIG. 1 for activating and deactivating assigned carriers.
Figure 6:
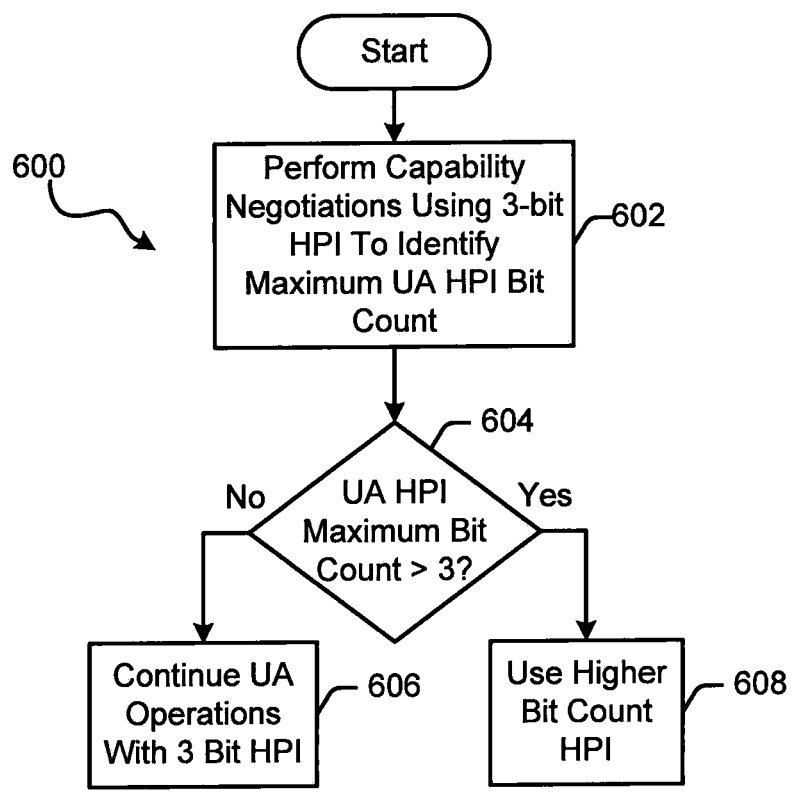
FIG. 6 is a flow chart illustrating a process that may be performed by the user agent of FIG. 1 for negotiating a DCI communication format and associated HPI bit count.

Referring still to FIGS. 1 and 5, at block 518, processor 14 monitors the PDCCH of the anchor carrier and the active assigned carriers (i.e., the assigned carriers are rendered active). At decision block 520, processor 14 determines whether or not a DCI packet has been received on one of the assigned carriers. Where a DCI packet has been received on one of the active assigned carriers, control passes to block 528 where the timer is reset to zero and control passes to block 516 where the timer is restarted. At block 520, where no DCI packet is received on the assigned carriers, control passes to decision block 522. At block 522, processor 14 determines whether or not the timer has reached the maximum timer value. Where the timer has not reached a maximum timer value, control passes back to block 518 where the anchor and assigned carrier channels are monitored. Where the timer reaches the maximum timer value at block 522, control passes to block 524 where processor 14 renders the assigned carriers inactive. At block 526, processor 14 resets the timer to zero and control passes back up to block 506 where the process described above continues.

Thus, it should be appreciated that as long as at least one DCI packet is received on one of the assigned carriers prior to the maximum timer value expiring, processor 14 will continue to monitor the control channels of the assigned carriers (i.e., the assigned carriers will remain active). However, once the maximum timer value times out without a DCI packet being received on one of the assigned carriers, the assigned carriers will be inactivated.

In at least some cases it is contemplated that, while some UA's may only be able to employ three-bit HPIs, enhancements to communication protocols and future UA's may enable some of those future UA's to employ HPIs having four or more bits. Here, where a system has to support legacy three bit HPI UA's as well as UA's that can use four or more bit HPIs, an access devices will have to perform capability negotiations with a UA prior to settling on an optimal DCI communication and HPI bit number protocol. To this end, according to another aspect of at least some embodiments of the present disclosure, when an access device first begins communication with a UA, the access device will use a DCI protocol including the legacy three bit HPI and, thereafter, if the UA 10 indicates that the UA 10 can communicate via a more optimal DCI protocol including four or more HPI bits, the communication protocol between the access device and the UA will be altered.

Consistent with the comments in the previous paragraph, a process 600 that may be performed by UA 10 is illustrated. At block 602, UA processor 14 performs capability negotiations with an access device 12 using three bit HPI to identify an optimal DCI format/communication protocol and corresponding maximum UA 10 HPI bit count. At block 604, where the maximum HPI bit count is greater than three, control passes to block 608 where UA 10 begins communicating using the higher bit count HPI. Where the maximum HPI bit count is not greater than three, control passes to block 606 where normal operation with three bit HPI continues.

Figure 7:
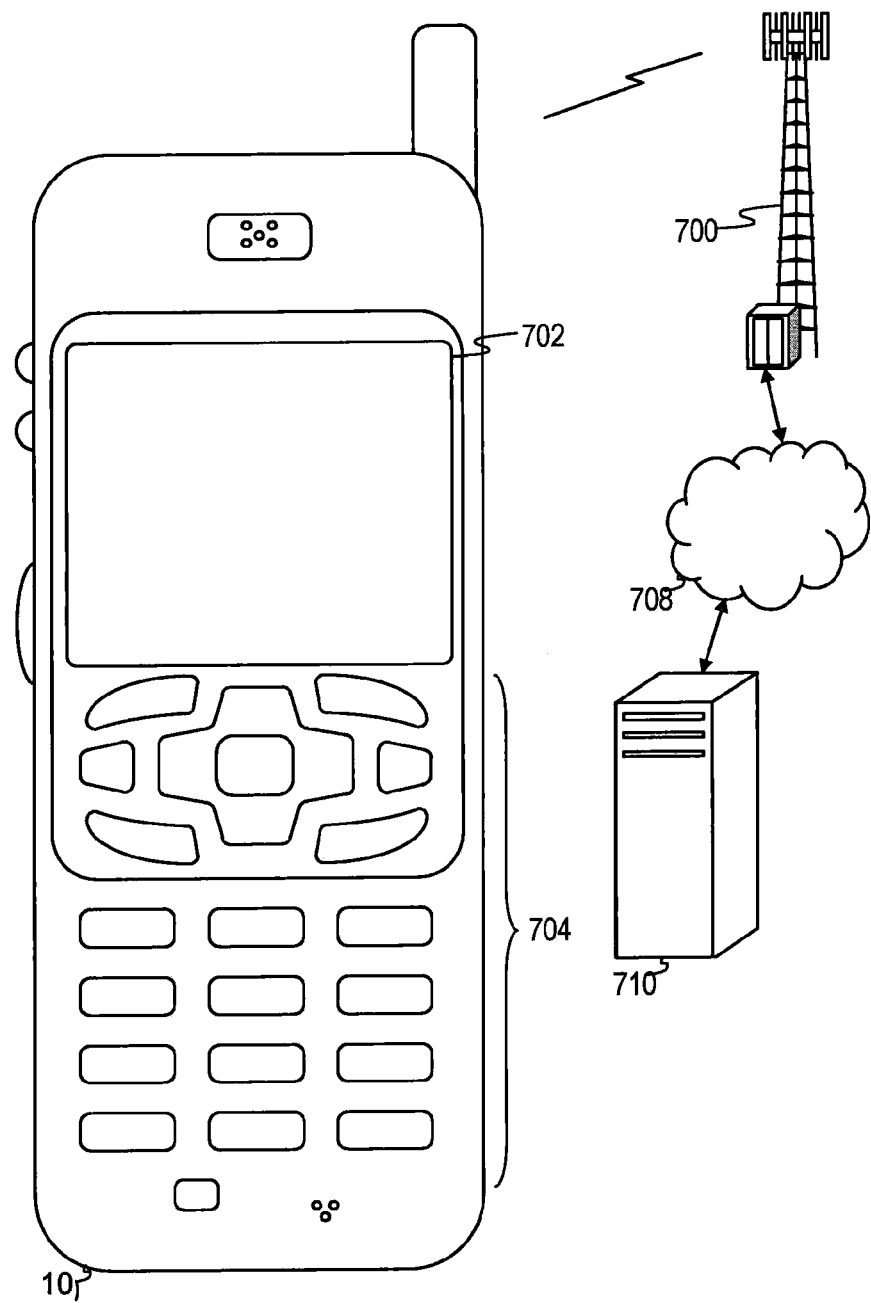
FIG. 7 is a diagram of a wireless communications system including a user agent operable for some of the various embodiments of the disclosure.

FIG. 7 illustrates a wireless communications system including an embodiment of the UA 10. The UA 10 is operable for implementing aspects of the disclosure, but the disclosure should not be limited to these implementations. Though illustrated as a mobile phone, the UA 10 may take various forms including a wireless handset, a pager, a personal digital assistant (PDA), a portable computer, a tablet computer, a laptop computer. Many suitable devices combine some or all of these functions. In some embodiments of the disclosure, the UA 10 is not a general purpose computing device like a portable, laptop or tablet computer, but rather is a special-purpose communications device such as a mobile phone, a wireless handset, a pager, a PDA, or a telecommunications device installed in a vehicle. The UA 10 may also be a device, include a device, or be included in a device that has similar capabilities but that is not transportable, such as a desktop computer, a set-top box, or a network node. The UA 10 may support specialized activities such as gaming, inventory control, job control, and/or task management functions, and so on.

The UA 10 includes a display 702. The UA 10 also includes a touch-sensitive surface, a keyboard or other input keys generally referred as 704 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UA 10 may present options for the user to select, controls for the user to actuate, and/or cursors or other indicators for the user to direct.

The UA 10 may further accept data entry from the user, including numbers to dial or various parameter values for configuring the operation of the UA 10. The UA 10 may further execute one or more software or firmware applications in response to user commands. These applications may configure the UA 10 to perform various customized functions in response to user interaction. Additionally, the UA 10 may be programmed and/or configured over-the-air, for example from a wireless base station, a wireless access point, or a peer UA 10.

Among the various applications executable by the UA 10 are a web browser, which enables the display 702 to show a web page. The web page may be obtained via wireless communications with a wireless network access node, a cell tower, a peer UA 10, or any other wireless communication network or system 700. The network 700 is coupled to a wired network 708, such as the Internet. Via the wireless link and the wired network, the UA 10 has access to information on various servers, such as a server 710. The server 710 may provide content that may be shown on the display 702. Alternately, the UA 10 may access the network 700 through a peer UA 10 acting as an intermediary, in a relay type or hop type of connection.

Figure 8:
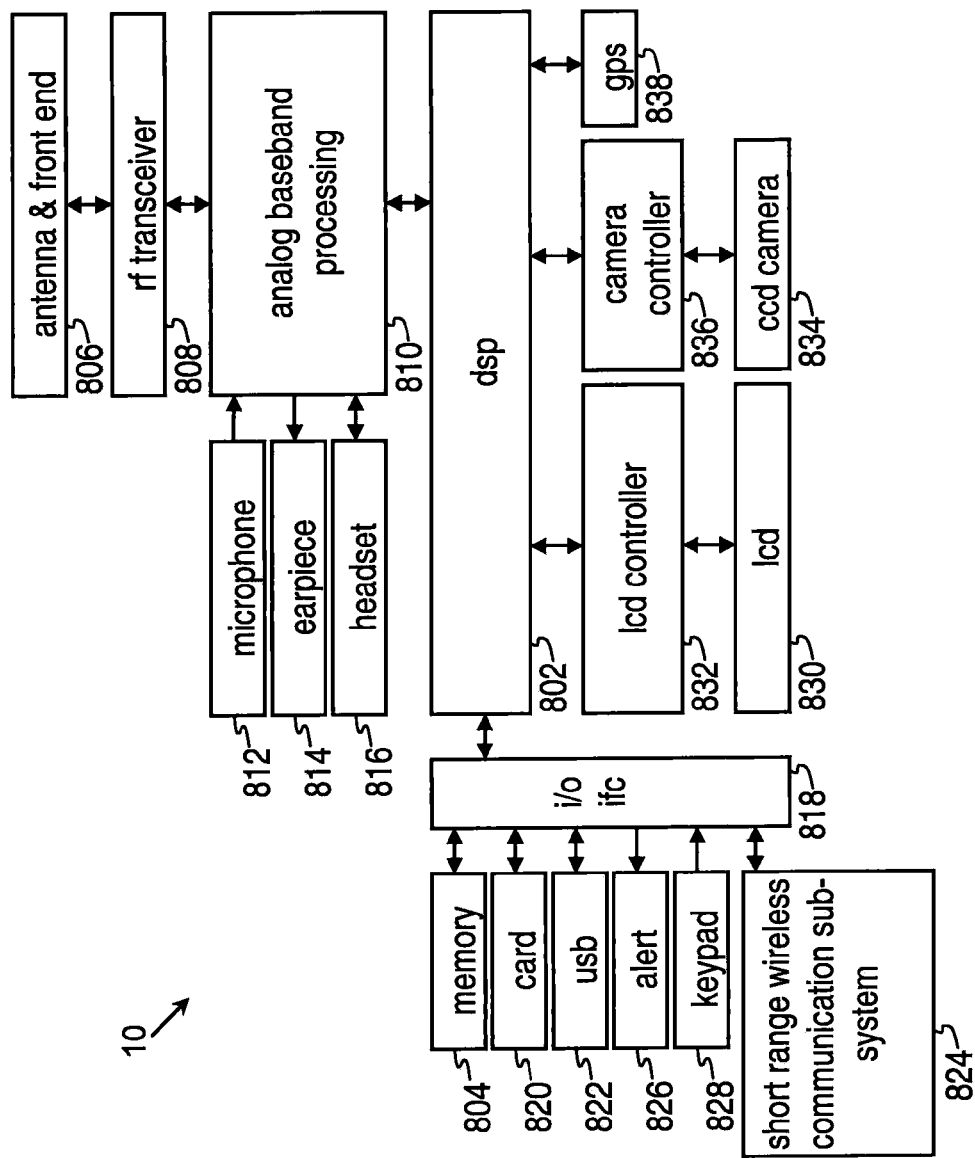
FIG. 8 is a block diagram of a user agent operable for some of the various embodiments of the disclosure.

FIG. 8 shows a block diagram of the UA 10. While a variety of known components of UAs 110 are depicted, in an embodiment a subset of the listed components and/or additional components not listed may be included in the UA 10. The UA 10 includes a digital signal processor (DSP) 802 and a memory 804. As shown, the UA 10 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the UA 10 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the UA 10 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the UA 10 to send and receive information from a cellular network or some other available wireless communications network or from a peer UA 10. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF Transceiver 808, portions of the Antenna and Front End 806, and the analog baseband processing unit 810 may be combined in one or more processing units and/or application specific integrated circuits (ASICs).

The analog baseband processing unit 810 may provide various analog processing of inputs and outputs, for example analog processing of inputs from the microphone 812 and the headset 816 and outputs to the earpiece 814 and the headset 816. To that end, the analog baseband processing unit 810 may have ports for connecting to the built-in microphone 812 and the earpiece speaker 814 that enable the UA 10 to be used as a cell phone. The analog baseband processing unit 810 may further include a port for connecting to a headset or other hands-free microphone and speaker configuration. The analog baseband processing unit 810 may provide digital-to-analog conversion in one signal direction and analog-to-digital conversion in the opposing signal direction. In some embodiments, at least some of the functionality of the analog baseband processing unit 810 may be provided by digital processing components, for example by the DSP 802 or by other central processing units.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the UA 10 and may also enable the UA 10 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the UA 10 to communicate wirelessly with other nearby mobile devices and/or wireless base stations.

The input/output interface 818 may further connect the DSP 802 to the alert 826 that, when triggered, causes the UA 10 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific pre-assigned melody for a particular caller.

The keypad 828 couples to the DSP 802 via the interface 818 to provide one mechanism for the user to make selections, enter information, and otherwise provide input to the UA 10. The keyboard 828 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 830, which may include touch screen capability and also display text and/or graphics to the user. The LCD controller 832 couples the DSP 802 to the LCD 830.

The CCD camera 834, if equipped, enables the UA 10 to take digital pictures. The DSP 802 communicates with the CCD camera 834 via the camera controller 836. In another embodiment, a camera operating according to a technology other than Charge Coupled Device cameras may be employed. The GPS sensor 838 is coupled to the DSP 802 to decode global positioning system signals, thereby enabling the UA 10 to determine its position. Various other peripherals may also be included to provide additional functions, e.g., radio and television reception.

Figure 9:
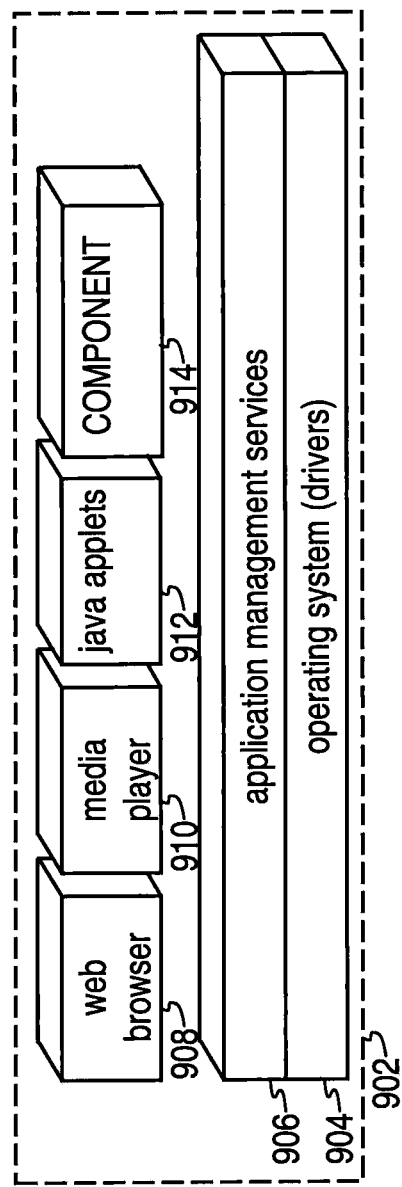
FIG. 9 is a diagram of a software environment that may be implemented on a user agent operable for some of the various embodiments of the disclosure.
Figure 10:
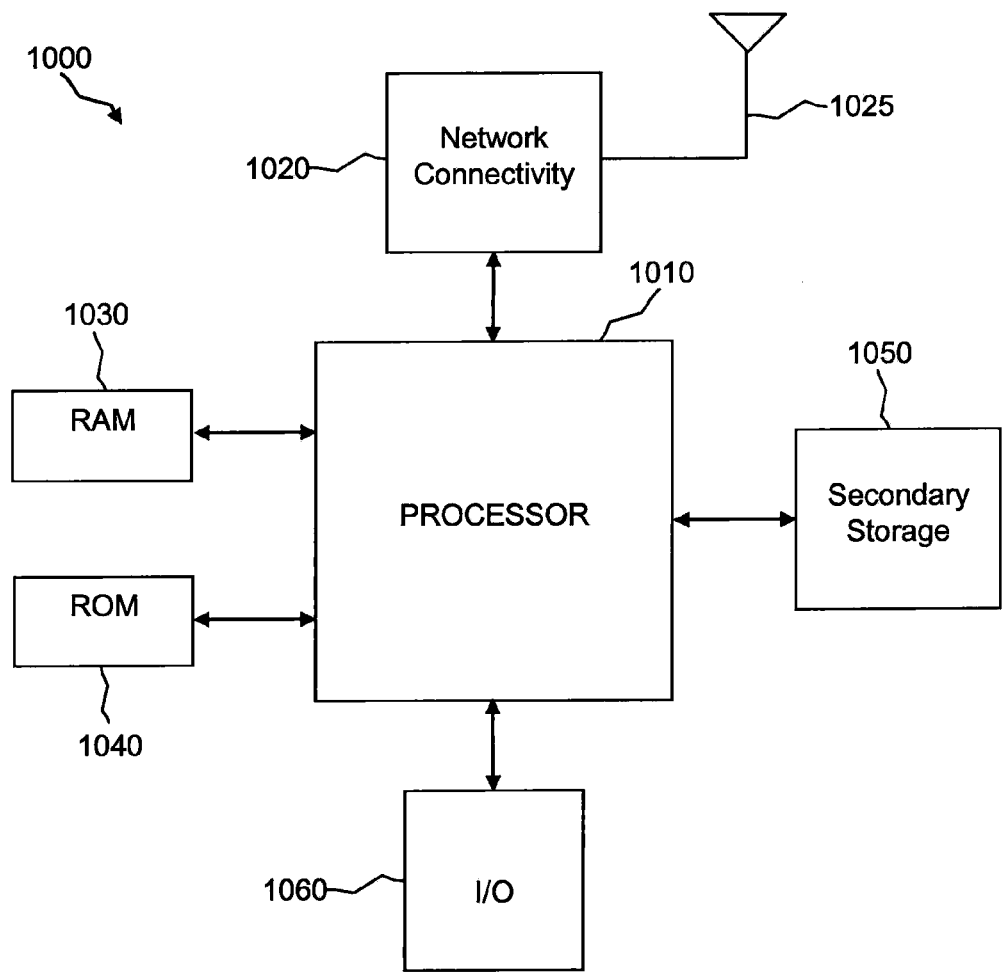
FIG. 10 is an illustrative general purpose computer system suitable for some of the various embodiments of the disclosure.

FIG. 9 illustrates a software environment 902 that may be implemented by the DSP 802. The DSP 802 executes operating system drivers 904 that provide a platform from which the rest of the software operates. The operating system drivers 904 provide drivers for the UA hardware with standardized interfaces that are accessible to application software. The operating system drivers 904 include application management services ("AMS") 906 that transfer control between applications running on the UA 10. Also shown in FIG. 10 are a web browser application 908, a media player application 910, and Java applets 912. The web browser application 908 configures the UA 10 to operate as a web browser, allowing a user to enter information into forms and select links to retrieve and view web pages. The media player application 910 configures the UA 10 to retrieve and play audio or audio-visual media. The Java applets 912 configure the UA 10 to provide games, utilities, and other functionality. A component 914 might provide functionality described herein.

The UA 10, access device 120, and other components described above might include a processing component that is capable of executing instructions related to the actions described above. FIG. 10 illustrates an example of a system 1000 that includes a processing component 1010 suitable for implementing one or more embodiments disclosed herein. In addition to the processor 1010 (which may be referred to as a central processor unit (CPU or DSP), the system 1000 might include network connectivity devices 1020, random access memory (RAM) 1030, read only memory (ROM) 1040, secondary storage 1050, and input/output (I/O) devices 1060. In some embodiments, a program for implementing the determination of a minimum number of HARQ process IDs may be stored in ROM 1040. In some cases, some of these components may not be present or may be combined in various combinations with one another or with other components not shown. These components might be located in a single physical entity or in more than one physical entity. Any actions described herein as being taken by the processor 1010 might be taken by the processor 1010 alone or by the processor 1010 in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1020 may enable the processor 1010 to communicate with the Internet or one or more telecommunications networks or other networks from which the processor 1010 might receive information or to which the processor 1010 might output information.

The network connectivity devices 1020 might also include one or more transceiver components 1025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1025 might include separate receiving and transmitting units or a single transceiver. Information transmitted or received by the transceiver 1025 may include data that has been processed by the processor 1010 or instructions that are to be executed by processor 1010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and might be used for non-volatile storage of data or as an over-flow data storage device if RAM 1030 is not large enough to hold all working data. Secondary storage 1050 may be used to store programs that are loaded into RAM 1030 when such programs are selected for execution.

The I/O devices 1060 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1025 might be considered to be a component of the I/O devices 1060 instead of or in addition to being a component of the network connectivity devices 1020. Some or all of the I/O devices 1060 may be substantially similar to various components depicted in the previously described drawing of the UA 10, such as the display 702 and the input 704.

The following 3rd Generation Partnership Project (3GPP) Technical Specifications (TS) are incorporated herein by reference: TS 36.321, TS 36.331, and TS 36.300.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

Figure 11:
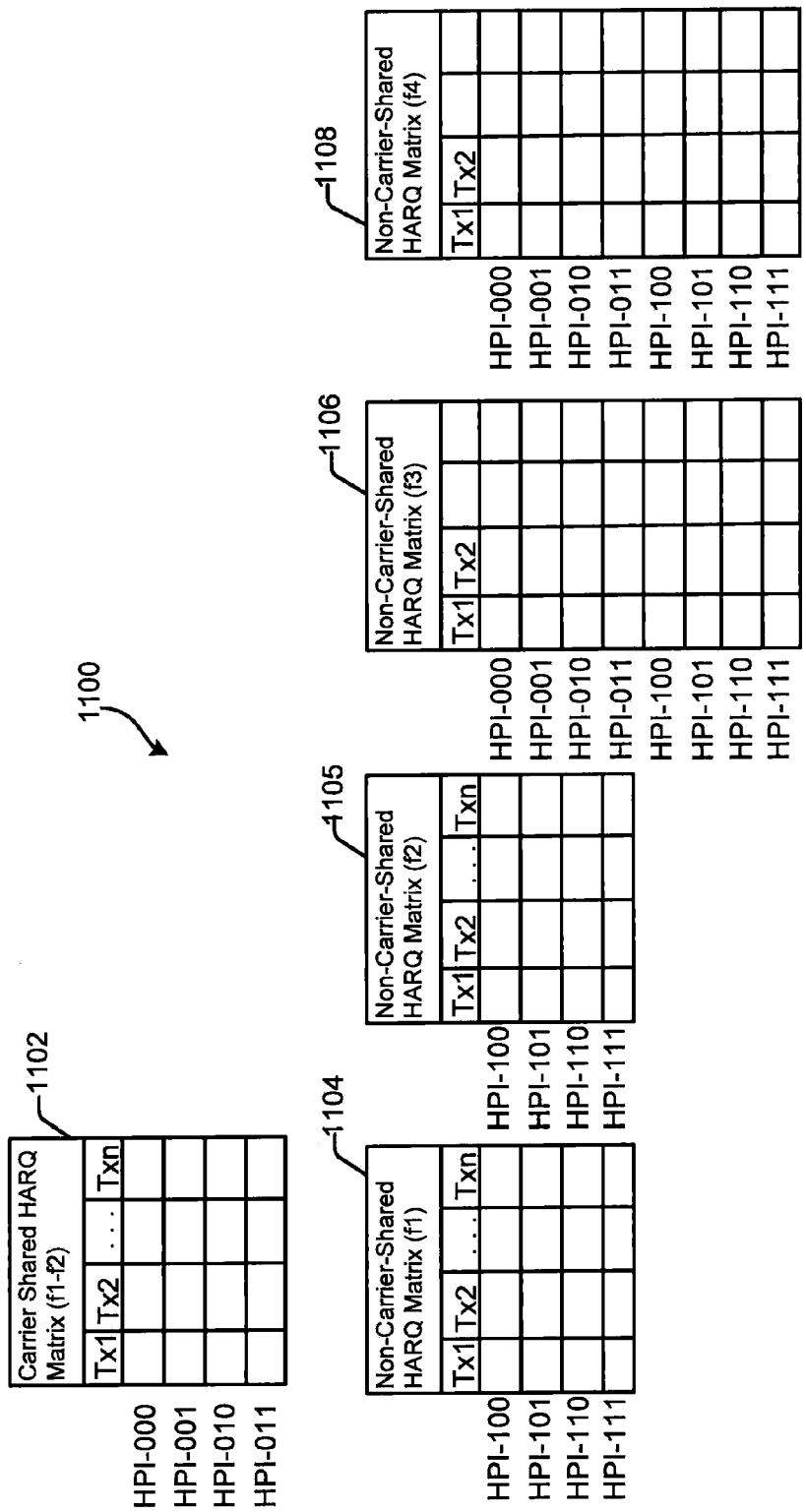
FIG. 11 is a schematic diagram illustrating another exemplary HARQ process buffer

In addition, while the example described above with respect to FIG. 1 includes carrier shared HPI and non-carrier-shared HPI, some embodiments are contemplated that include partially shared HPI. For instance, an HPI may be shared among a subset of system frequencies where the balance of system frequencies each combine with the HPI to specify specific HARQ processes. For example, referring to FIG. 11, an exemplary set 1100 of matrices 1102-1108 that form an alternate process decoding buffer are illustrated. In FIG. 11, matrix 1102 indicates that HPI 000, 001, 010 and 011 are shared for frequencies f1 and f2. Here, however, matrices 1106 and 1108 indicate that for frequencies f3 and f4 the HPI 000, 001, 010 and 011 are not shared. In addition, matrices 1104, 1105, 1106 and 1108 indicate that each of HPI 100, 101, 110 and 111 are non-carrier-shared.

In the FIG. 11 example, in addition to identifying HPI, the UA processor 14 would have to always identify traffic packet carrier (i.e., transmission frequency). Where any of the partially shared HPI 000, 001, 010 or 011 is received, frequency f1 and f2 traffic packets incorrectly received are stored by HPI in matrix 1102. Where any of partially shared HPI 000, 001, 010 or 011 is received, frequency f3 or f4 traffic packets incorrectly received are stored by HPI in matrix 1106 and 1108, respectively.

To apprise the public of the scope of this invention, the following claims are made:

What is claimed is:

1. A method comprising:
   starting, by a user agent supporting multiple carriers in a wireless communication network, a timer;
   monitoring, by the user agent, a physical downlink control channel (PDCCH) of at least two assigned carriers of the multiple carriers, the at least two assigned carriers being rendered active by an access device in the network;
   determining, by the user agent, whether a downlink control information (DCI) packet has been received on any of the at least one assigned carrier; and
   if a DCI packet has been received on any of the at least two assigned carriers, restarting the timer; and
   determining a hybrid automatic repeat request (HARQ) process index (HPI) based on the received DCI packet;
   identifying a downlink resource based on the received DCI packet;
   receiving a downlink transmission using the identified downlink resource; and
   associating the received downlink transmission with a buffer corresponding to a combination of the HPI and the assigned carrier on which the downlink transmission was received.

2. The method of claims 1, wherein monitoring the PDCCH comprises monitoring the PDCCH until the timer expires.

3. The method of claim 2, further comprising continuing, by the user agent, to monitor the PDCCH if the DCI packet has been received on any of the at least two assigned carriers before the timer expires.

4. The method of claim 1, further comprising monitoring, by the user agent, a PDCCH of an anchor carrier of the multiple carriers, wherein the anchor carrier is the only carrier routinely monitored by the user agent.

5. A user agent for use in a wireless communication network, the user agent comprising:
   a processor configured to:
      start a timer; and
      monitor a physical downlink control channel (PDCCH) of at least two assigned carriers of multiple carriers in the wireless communication network, the at least two assigned carriers being rendered active by an access device in the network;
      determine whether a downlink control information (DCI) packet has been received on any of the at least two assigned carriers; and if a DCI packet has been received on any of the at least moat least two assigned carriers, restart the timer;
      determine a hybrid automatic repeat request (HARQ) process index (HPI) based on the received DCI packet;
      identify a downlink resource based on the received DCI packet;
      receive a downlink transmission using the identified downlink resource; and
      associate the received downlink transmission with a buffer corresponding to a combination of the HPI and the assigned carrier on which the downlink transmission was received.

6. The user agent of claim 5, wherein the processor is configured to monitor the PDCCH until the timer expires.

7. The user agent of claim 6, wherein the processor is further configured to continue to monitor the PDCCH if the DCI packet has been received on any of the at least two assigned carrier before the timer expires.

8. The user agent of claim 5, wherein the processor is further configured to monitor a PDCCH of an anchor carrier of the multiple carriers, wherein the anchor carrier is the only carrier routinely monitored by the user agent.

* * * * *

UNITED STATES PATENT AND TRADEMARK OFFICE
CERTIFICATE OF CORRECTION

PATENT NO. : 8,942,190 B2  
APPLICATION NO. : 12/723202  
DATED : January 27, 2015  
INVENTOR(S) : Sean Michael McBeath et al.

It is certified that error appears in the above-identified patent and that said Letters Patent is hereby corrected as shown below:

On the Title Page

Page 2, Column 2 (Other Publications), Line 28, Delete "the the" and insert -- the --, therefor.

In the Claims

Column 20, Line 20, In Claim 2, delete "claims 1," and insert -- claim 1, --, therefor.

Column 20, Line 43, In Claim 5, after "at least" delete "moat least".

Signed and Sealed this  
Ninth Day of June, 2015

Michelle K. Lee  
*Director of the United States Patent and Trademark Office*